M. P. Carpenter,
Sewing Machine.

No. 4002. Reissued May 31. 1870.

Witnesses:
C. M. Smith
David P. Smith

Inventor:
Mary P. Carpenter

UNITED STATES PATENT OFFICE.

MARY P. CARPENTER, OF SAN FRANCISCO, CALIFORNIA.

IMPROVEMENT IN NEEDLES FOR SEWING-MACHINES.

Specification forming part of Letters Patent No. 99,158, dated January 25, 1870; Reissue No. 4,002, dated May 31, 1870.

*To all whom it may concern:*

Be it known that I, MARY P. CARPENTER, of the city and county of San Francisco, State of California, did invent a new and useful Improvement in Needle-Arms and Needles for Sewing-Machines, (for which Letters Patent of the United States were granted to me, the said MARY P. CARPENTER, bearing date the 25th of January, 1870, and numbered 99,158;) that the said Letters Patent are believed to be inoperative by reason of a defective and insufficient description and specification, which defects and insufficiencies have arisen from inadvertence and mistake and without any fraudulent intention; and that the following is a full, clear, and exact description of the same invention, distinguishing it from all other things before known and the manner of working the same, so as to enable any person skilled in the art or science to which it most nearly appertains to make and use the said invention without further invention or experiment.

My invention relates to certain improvements in that class of devices which have for their object the facilitating of the operation known as threading the needle of sewing-machines; and it consists in certain details of construction of the needle and the arm or bar to which the needle is attached, as will hereinafter more fully appear.

Figure 1:
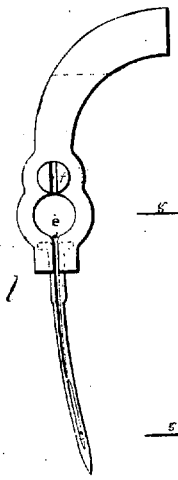
Figure 2:
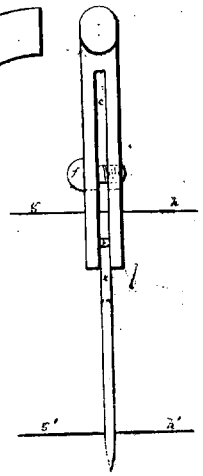
Figure 4:
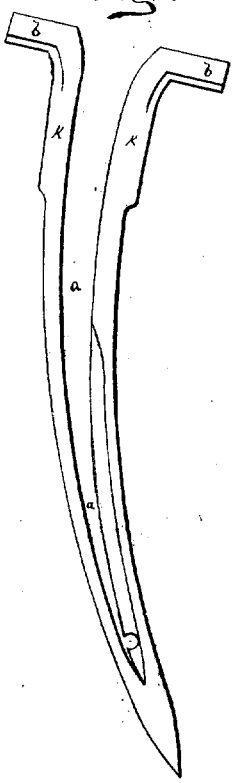
Figure 5:
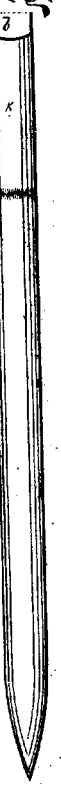
Figure 3:
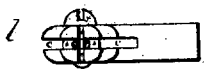

In the drawings, Figure 1 represents a side elevation of a needle and a portion of an arm having my improvements; Fig. 2, a rear elevation of same; Fig. 3, a view of under side of same, showing the needle in section. Fig. 4 is a side elevation of such a needle much enlarged. Fig. 5 is a front elevation of same.

Like letters refer to like parts.

To place the needle in position in the clamp, as shown in Figs. 1, 2, and 3, with the passage *a* slightly open at the top, but closed near the eye, I first place a small slip of paper or other substance about equal in thickness to the thread to be used between the faces of the passage *a* at the upper end, and, grasping the needle between the thumb and finger of the left hand in such a manner as to close the passage, insert the needle, so that while the lugs *b* enter the slot *c* the paper will enter the transverse slot *d*, and by turning the screw *f* the needle will be held fast and the paper can be withdrawn.

From this description it will be observed that the object of the lugs *b* is to obtain abundant bearing-surface for the faces of the clamp to press against; but it will also be seen that the same object would be attained without the lugs by flattening the upper ends of the needle.

The operation of threading will be readily understood by supposing the line *g h*, Fig. 2, to represent the position of a thread after having passed the end through the opening *e*, and the line *g′ h′*, passing through the eye, the position of the same thread after the operation of threading has been performed, for it is plain that if we grasp the thread with one hand at *g* and with the other hand at *h* we can carry it directly downward into the slot *d* and passage *a*, and down between the yielding faces of the passage *a* to the line *g′ h′*, and that when the thread has reached the eye the passage *a* would again close and prevent it from escaping.

I am aware that needles have been invented having a slit or passage from some point above to some point below the eye of the needle, through which the thread is admitted; but when both parts of the needle forming this slit or passage are not firmly secured at both ends it is evident that needles so constructed must be made very large in proportion to their strength, and therefore are not fit for fine sewing; and, also, if the slit or passage does not extend up so high that the loose end is never thrust through the cloth, there is a liability to catch in passing. To obviate these difficulties a needle has been invented having two eyes—a large and a small one—connected by a slit or passage in which the operation of threading is about the same as in my own invention; but this two-eyed needle has an element of weakness in its great length and peculiar construction equal perhaps to some of the others referred to, while by my invention all the advantages attained by any of the others are secured, combined with greater simplicity of construction, and a needle is provided that can be used for the finest kind of work on account of its great strength in proportion to its diameter.

Having thus described my invention, what I claim, and desire to secure by Letters Patent, is—

1. The split needle, constructed as herein described, having the flattened ends *k k*, projections *b b*, and passage *a*, extending below and at one side of the needle and out at the top, as and for the purpose set forth.

2. The clamp *l*, provided with the slot *c d*, opening *e*, and screw *f*, when the parts are arranged relatively to each other, as described, for the purpose set forth.

3. The combination of the needle-arm provided with the clamp *l*, the opening *e*, and slot *d*, with the needle having the passage *a* and ends *k*, the whole constructed and arranged to operate substantially as described, and for the purpose specified.

In testimony whereof I have hereunto set my hand and seal.

MARY P. CARPENTER. [L. S.]

Witnesses:

C. W. M. SMITH,

H. G. TIBBEY.